(12) United States Patent
Hillis et al.

(10) Patent No.: US 11,619,998 B2
(45) Date of Patent: *Apr. 4, 2023

(54) COMMUNICATION BETWEEN AUTONOMOUS VEHICLE AND EXTERNAL OBSERVERS

(71) Applicant: Applied Invention, LLC, Burbank, CA (US)

(72) Inventors: W. Daniel Hillis, Encino, CA (US); Kjerstin I. Williams, Los Angeles, CA (US); Thomas A. Tombrello, Altadena, CA (US); James W. Sarrett, Los Angeles, CA (US); Luke W. Khanlian, Granada Hills, CA (US); Adrian L. Kaehler, Los Angeles, CA (US); Russel Howe, La Cresenta, CA (US)

(73) Assignee: APPLIED INVENTION, LLC, Burbank, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 16/380,896

(22) Filed: Apr. 10, 2019

(65) Prior Publication Data

US 2019/0235635 A1 Aug. 1, 2019

Related U.S. Application Data

(63) Continuation of application No. 15/273,222, filed on Sep. 22, 2016, now Pat. No. 10,303,257, which is a
(Continued)

(51) Int. Cl.
*B60Q 1/26* (2006.01)
*B60Q 1/50* (2006.01)
(Continued)

(52) U.S. Cl.
CPC ............. *G06F 3/017* (2013.01); *B60Q 1/26* (2013.01); *B60Q 1/50* (2013.01); *B60Q 5/005* (2013.01);
(Continued)

(58) Field of Classification Search
CPC ...... B60Q 2400/50; B60Q 1/50; B60Q 5/005; G06F 3/017; G05D 1/0088; G06T 13/80
(Continued)

(56) References Cited

U.S. PATENT DOCUMENTS 6,282,823 B1 * 9/2001 Brown .................... G09F 21/04
40/218
8,954,252 B1 2/2015 Urmson et al.
(Continued)

*Primary Examiner* — Krishnan Ramesh
(74) *Attorney, Agent, or Firm* — Perkins Coie LLP; Michael Glenn; Vikram Iyengar

(57) ABSTRACT

At least one embodiment of this disclosure includes a method for an autonomous vehicle (e.g., a fully autonomous or semi-autonomous vehicle) to communicate with external observers. The method includes: receiving a task at the autonomous vehicle; collecting data that characterizes a surrounding environment of the autonomous vehicle from a sensor coupled to the autonomous vehicle; determining an intended course of action for the autonomous vehicle to undertake based on the task and the collected data; and conveying a human understandable output via an output device, the human understandable output expressly or implicitly indicating the intended course of action to an external observer.

20 Claims, 13 Drawing Sheets

Related U.S. Application Data continuation of application No. 14/285,357, filed on May 22, 2014, now Pat. No. 9,475,422.

(51) Int. Cl.
  *B60Q 5/00* (2006.01)
  *G05D 1/00* (2006.01)
  *G06F 3/01* (2006.01)
  *G06T 13/80* (2011.01)

(52) U.S. Cl.
  CPC ........... *G05D 1/0088* (2013.01); *G06T 13/80* (2013.01); *B60Q 2400/50* (2013.01); *G06T 2200/24* (2013.01)

(58) Field of Classification Search
  USPC .......................................................... 701/23
  See application file for complete search history.

(56) References Cited

U.S. PATENT DOCUMENTS

| | | |
|---|---|---|
| 2001/0019356 A1 | 9/2001 | Takeda et al. |
| 2006/0055525 A1 | 3/2006 | Kubota et al. |
| 2006/0265918 A1* | 11/2006 | Meyer .................... G09F 19/08 40/411 |
| 2008/0059007 A1* | 3/2008 | Whittaker ................ G08G 1/22 701/2 |
| 2009/0079839 A1* | 3/2009 | Fischer .................... G01S 17/86 348/218.1 |
| 2009/0166899 A1 | 7/2009 | Van Haren et al. |
| 2009/0174573 A1* | 7/2009 | Smith ..................... G08G 1/166 340/905 |
| 2011/0140919 A1 | 6/2011 | Hara et al. |
| 2012/0025964 A1* | 2/2012 | Beggs ..................... G08B 21/18 340/435 |
| 2012/0308076 A1* | 12/2012 | Piekniewski .......... G06N 3/049 382/103 |
| 2013/0328673 A1 | 12/2013 | Ishikawa et al. |
| 2014/0064609 A1* | 3/2014 | Petre ..................... G06K 9/4628 382/159 |
| 2014/0214260 A1* | 7/2014 | Eckert ...................... B60Q 1/48 701/28 |
| 2015/0153735 A1* | 6/2015 | Clarke .................. B60W 40/06 701/301 |
| 2015/0197185 A1* | 7/2015 | Jones ....................... B60Q 1/50 340/468 |
| 2015/0203023 A1* | 7/2015 | Marti .................... B60W 30/10 340/425.5 |
| 2015/0228195 A1* | 8/2015 | Beaurepaire ............. B60Q 1/50 340/907 |
| 2015/0268665 A1* | 9/2015 | Ludwick ............... B60Q 5/008 701/23 |

* cited by examiner

COMMUNICATION BETWEEN AUTONOMOUS VEHICLE AND EXTERNAL OBSERVERS

CROSS-REFERENCE TO RELATED APPLICATIONS

This application is a continuation of U.S. patent application Ser. No. 15/273,222, entitled "COMMUNICATION BETWEEN AUTONOMOUS VEHICLE AND EXTERNAL OBSERVERS," filed on Sep. 22, 2016 which is a continuation of U.S. patent application Ser. No. 14/285,357, entitled "COMMUNICATION BETWEEN AUTONOMOUS VEHICLE AND EXTERNAL OBSERVERS," filed on May 22, 2014, now U.S. Pat. No. 9,475,422, all of which are incorporated herein by this reference in their entirety.

RELATED FIELD

The disclosure relates to autonomous vehicles and in particular to communications between autonomous vehicles and humans.

BACKGROUND

Operating a vehicle (e.g., a car, a truck, or a bike) is a challenging task because a driver has to learn to operate the vehicle, navigate within the limitations of traffic laws and the physical environment, and communicate with other proximate drivers in that same physical environment (e.g., a road, a parking lot, etc.). Regarding the last requirement, human drivers signal their intentions through a number of intentional and subconscious acts. Some of these signals rely on devices, which are purposely built into the vehicle, such as turn signals and brake lights. Other signals rely on innate human characteristics. These characteristics include intentional actions, such as waving a hand to signal another driver to proceed through an intersection and subconscious or reactive actions, such as a driver turning his head before merging lanes. When all other forms of signaling have failed, human drivers are usually able to speak their intentions or ask for assistance, such as when a vehicle breaks down or when a driver becomes lost.

The signals conveyed are perceived by external observers, such as pedestrians, other drivers, or traffic control officers. The external observers are able to interpret these signals to gain insight into a driver's intentions. These insights are important to enable safe and efficient flow of vehicular traffic as well as for providing assistance when needed. A central feature of all of these methods is that an external observer need not employ any special equipment to understand the signal conveyed and most signals do not require any training to discern.

Advances in autonomous vehicles enable computers or other electronic devices to drive vehicles. At least two types of autonomous vehicles exist today—fully autonomous vehicles with no human passengers and semi-autonomous vehicles that are capable of operating in an autonomous mode while carrying human passengers. As the number of autonomous vehicles increases, there will be a need for better communication methods between the autonomous vehicles and external observers. Unfortunately, the signaling methods that are currently built into vehicles, such as turn signals and brake lights, only provide the ability to communicate a small subset of the information which is required. The signal and brake lights provide a limited ability to communicate with external observers. No known current autonomous vehicle provides a comprehensive means for signaling external observers.

DISCLOSURE OVERVIEW

Broadly speaking, the embodiments disclosed herein describe a number of designs and methods that enable autonomous vehicles to convey navigation-related intentions to external observers. In one aspect, this disclosure describes various ways of conveying information to external observers using images displayed on the vehicle. These images may be symbols, words, or pictures. In another aspect, the disclosure describes various ways of notifying external observers of the vehicle's intention to convey information. This notification may be accomplished using lights or sounds.

The disclosure also describes various ways of conveying information to external observers using images projected on the ground in proximity to the vehicle. These projections may include information concerning the intended trajectory of the vehicle as well as the anti-trajectory (i.e., an area where the vehicle specifically will not travel).

Additionally, the disclosure describes various ways of conveying information to external observers using an anthropomorphic device. The anthropomorphic device may be a purpose built object or it may be incorporated as part of a sensor pack already installed on the vehicle. The anthropomorphic device may also be in the form of an image. Finally, the disclosure describes various ways of conveying information to external observers using a movement state indicator (e.g., a three-state indicator).

This Disclosure Overview is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the disclosure is provided in the following written description of various embodiments, illustrated in the accompanying drawings, and defined in the appended claims. Some embodiments of this disclosure have other aspects, elements, features, and steps in addition to or in place of what is described above. These potential additions and replacements are described throughout the rest of the specification.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
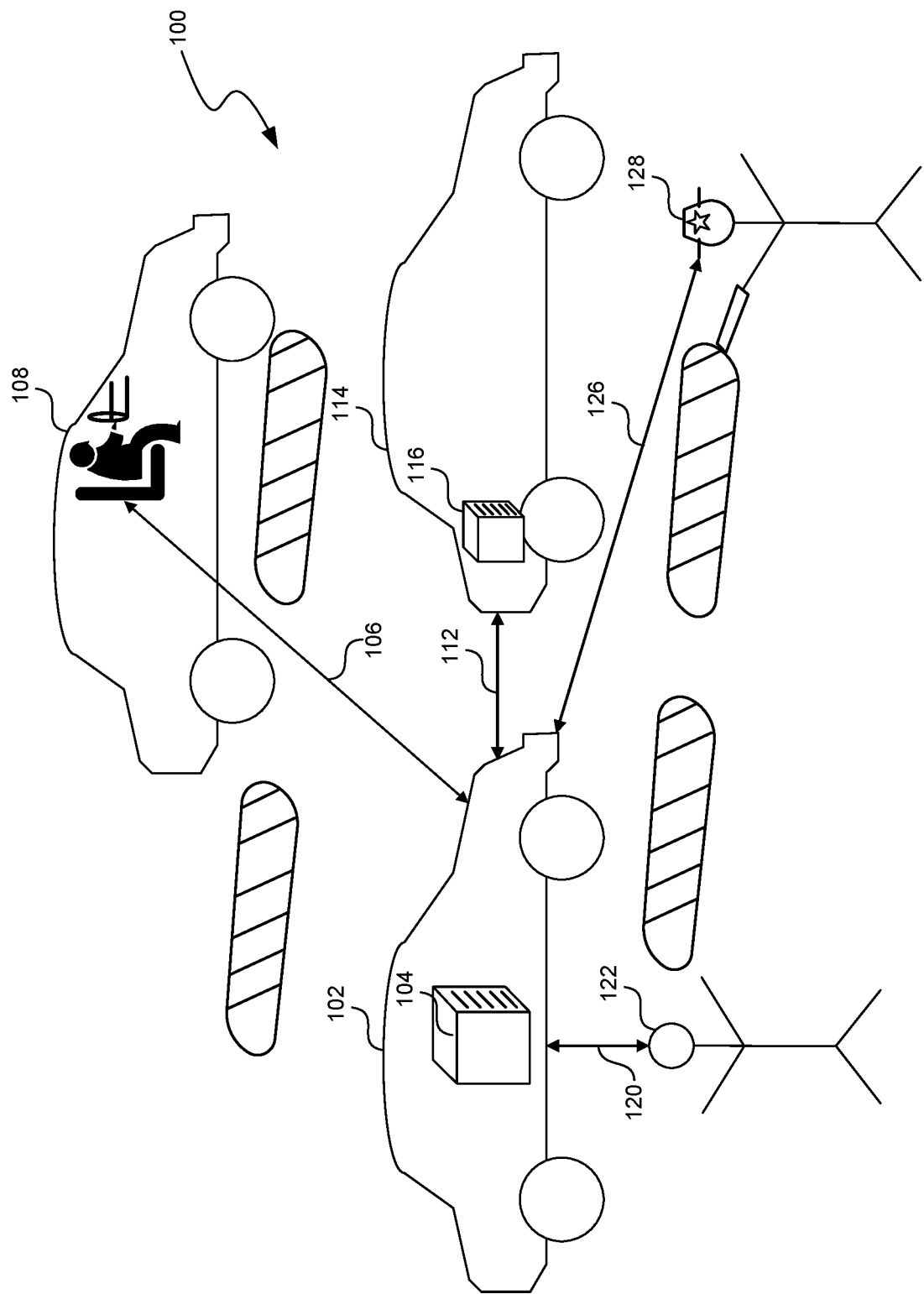
FIG. 1 is a navigational environment of a vehicle capable of indicating its navigational intentions to an external observer, in accordance with various embodiments.

FIG. 1 is a navigational environment 100 of a vehicle 102 capable of indicating its navigational intentions to an external observer, in accordance with various embodiments. Present day autonomous vehicles provide little, if any, notification of their intentions in a discernible form to an external observer. This makes it challenging for people or systems near such autonomous vehicle to plan its behavior or react to the behaviors of the autonomous vehicle. The disclosed autonomous vehicle, such as the vehicle 102, solves the above challenge by conveying the intentions of the vehicle 102 in a variety of human understandable forms, using light or sound.

The vehicle 102 can be an autonomous vehicle (e.g., a fully autonomous or a semi-autonomous vehicle) that has an assigned task. The vehicle 102 includes a first control system 104, which can be implemented by a computing device, such as a computer, a field programmable gate array (FPGA), an application specific integrated circuit (ASIC), or other electronic devices or systems. The task can be a navigation-related job, in that it requires the vehicle to navigate in some manner, which the vehicle 102 attempts to complete. For example, the task may require that the vehicle 102 navigate from a starting point to an ending point (e.g., a destination address). The ending point may be open ended, in that it may be changed or amended over time. The task may also require the vehicle 102 to pass a number of waypoints along the way or to follow a predefined route. The vehicle 102 is equipped with various sensors that gather data concerning the vehicle's surroundings. Based on this data and its assigned task, the vehicle plans an intended course of action which it conveys to external observers in a human understandable form.

FIG. 1 illustrates some of the potential forms of communication that the vehicle 102 is capable of utilizing to convey its intentions to the external observers. In one example, the communication can take the form of human driver communication 106, which involves the first control system 104 of the vehicle 102 and a human driver 108. The human driver communication 106 can be a light (e.g., a beam, a flash, other radiating shapes), a sound, a display, an animation, or any combination thereof. The human driver communication 106 can be generated from an output device of the vehicle 102 that is not a conventional signal light or brake light.

Another example, the communication can take the form of inter-device communication 112, which involves the first control system 104 and a second control system 116 of another vehicle 114 (e.g., another autonomous vehicle). For example, this type of communication can involve wireless digital or analog communication. For another example, the inter-device communication 112 can be steganographic communication with digital information encoded into a human understandable presentation (e.g., an image or a sound). The inter-device communication 112 can also be other optical based, radio frequency based, or acoustic-based communication with encoded information.

In yet another example, the communication can take the form of pedestrian communication 120, which involves the first control system 104 and a pedestrian 122. The pedestrian 122 can be any external observer who is not driving a vehicle. In a further example, the communication can take the form of traffic controller communication 126, which involves the first control system 104 and a traffic controller 128. The traffic controller 128 can be a person with the authority to control traffic (e.g., a road worker, a police officer, etc.), a traffic control device, or an agent terminal device within the navigational environment 100 for a remote person to control the traffic. The pedestrian communication 120 and the traffic controller communication 126 can take the forms similar to the human driver communication 106, including a light, a sound, a display, an animation, or any combination thereof. In some embodiments, the first control system 104 can simultaneously present or generate any of the human driver communication 106, the inter-device communication 112, the pedestrian communication 120, and the traffic controller communication 126.

Figure 2:
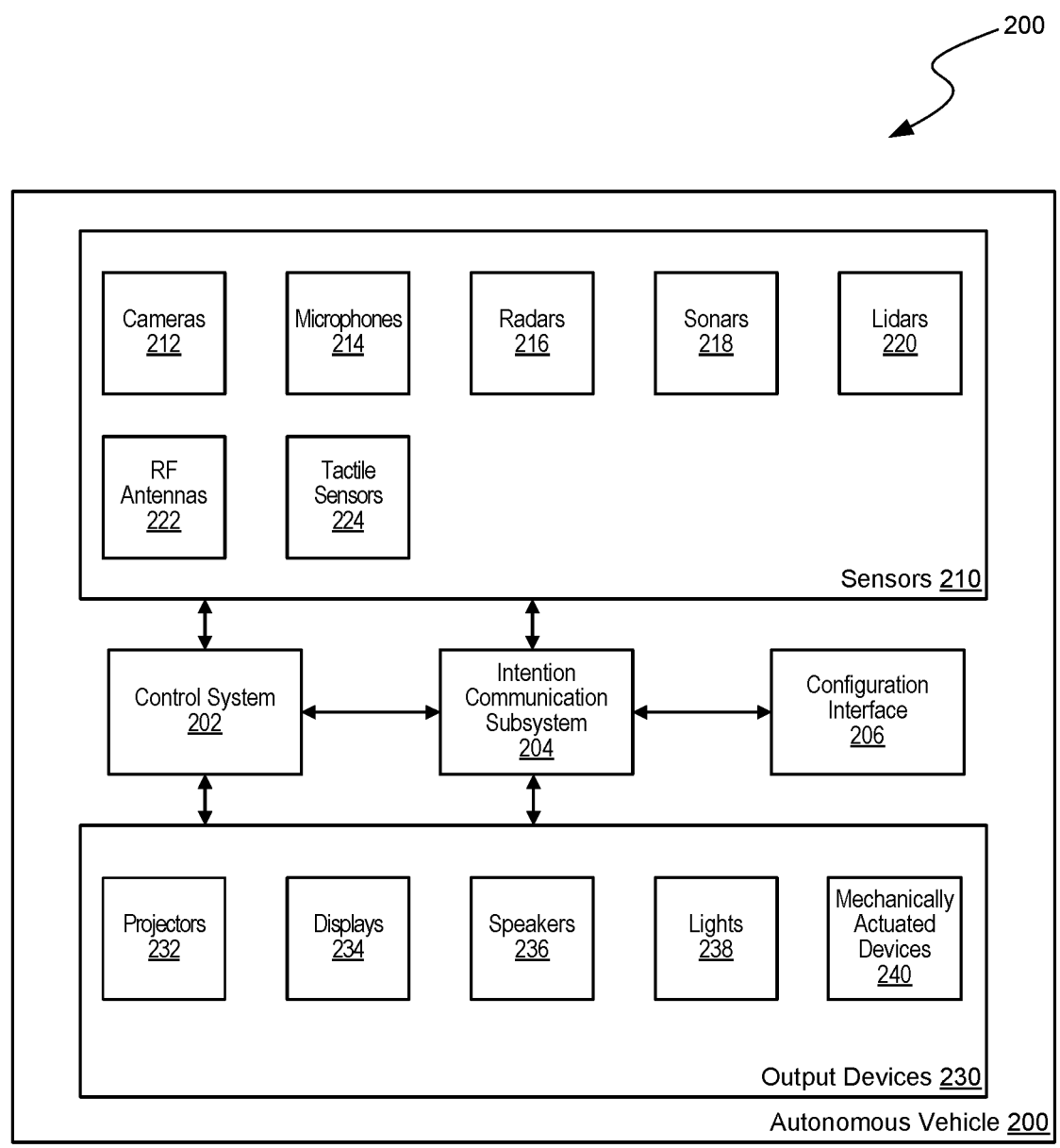
FIG. 2 is an example of an autonomous vehicle in accordance with various embodiments.

FIG. 2 is an example of an autonomous vehicle 200 in accordance with various embodiments. The autonomous vehicle 200 may be a fully autonomous vehicle or a semi-autonomous vehicle. The autonomous vehicle 200 includes a control system 202 (e.g., including the first control system 104 of FIG. 1). The control system 202 determines (e.g., calculates and plans) a trajectory for the autonomous vehicle 200 and execute the trajectory in accordance with the traffic laws and physical limitations of its surrounding environment, such as the navigational environment 100 of FIG. 1. The autonomous vehicle 200 further includes an intention communication subsystem 204. In some embodiments, the intention communication subsystem 204 is physically integrated with the control system 202. In other embodiments, the intention communication subsystem 204 is a separate device coupled to the control system 202, via a wire or wirelessly. In some embodiments, the control system 202 and/or the intention communication subsystem 204 can be detachable from the autonomous vehicle 200 and/or can be portable.

The intention communication subsystem 204 is able to generate a human understandable output to convey an intended course of action (e.g., the trajectory) of the autonomous vehicle 200. The intended course of action can be explicitly illustrated or implicitly illustrated (e.g., by acknowledging a traffic law, an obstacle, or a physical border beyond which the autonomous vehicle 200 will not traverse). For example, the control system 202 can determine the intended course of action based on one or more user configurations (e.g., by setting a destination) through a configuration interface 206. The control system 202 can also take into account the surrounding environment of the autonomous vehicle 200 based on sensor inputs from one or more sensors 210. Based on the sensor inputs and the user configurations, the control system 202 is then able to determine the trajectory and route to be taken by the autonomous vehicle 200 and any additional actions needed to navigate to the destination (e.g., avoiding obstacles, avoiding violations of traffic law, reach intermediary waypoints, etc.).

The sensors 210 can include one or more cameras 212, one or more microphones 214, one or more radars 216, one or more sonars 218, one or more lidars 220, one or more radio frequency (RF) antennas 222 (as a sensor and/or a transceiver for machine readable communication), one or more tactile sensors 224, other types of passive or active sensors, or any combination thereof. The tactile sensors 224 can detect contact between an external object (e.g., a person or an object) and the autonomous vehicle 200. For example, the tactile sensors 224 can be force sensors, accelerometers, or touchscreen sensors. The sensors 210 collect data describing the surrounding environment of the autonomous vehicle 200 and/or providing self-diagnosis feedback of the autonomous vehicle 200 (e.g., relative to the surrounding environment). The control system 202 can also record metadata from the sensors 210 for further analysis. For example, such analysis includes the control system 202 detecting various events, conditions, and objects through the collected data, including detecting traffic events, accidents, pedestrians, fellow drivers, fellow vehicles, active or passive traffic signs, road conditions, weather conditions, or any combination thereof. The control system 202 can further detect characteristics of such events or objects, including types of fellow vehicles, relative locations of the detected objects, anticipated behaviors of the detected objects, locations of sensors of detected devices, locations of perceptive organs (e.g., eyes or ears) of detected people, or any combination thereof.

The intention communication subsystem 204 expresses and conveys the human understandable outputs through one or more output devices 230. The output devices 230 includes one or more projectors 232, one or more display devices 234, one or more speakers 236, one or more lights 238, one or more mechanically actuated devices 240, or any combination thereof. The output devices 230 can be unidirectional, bidirectional, multidirectional, or omnidirectional.

When conveying a human understandable output using the output devices 230, the intention communication subsystem 204 can direct the one or more of the output devices 230 at a detected external observer or an area that the detected external observer can perceive. In various embodiments, the intention communication subsystem 204 can present the detected objects (e.g., detected based on the sensor data) in the human understandable output to acknowledge the control system 202's awareness of the obstacle.

A user of the autonomous vehicle 200 can further configure the human understandable output, such as the form of the output, through the configuration interface 206. For example, the user can choose the best form of communication to express and convey an intended course of action as determined by the control system 202. The configuration interface 206 can present two or more options for conveying the intended course of action through the output devices 230. For example, below are several examples of human understandable outputs that can be used to expressly or implicitly indicate the intended course of action of the autonomous vehicle 200.

Display on Vehicle

Figure 3:
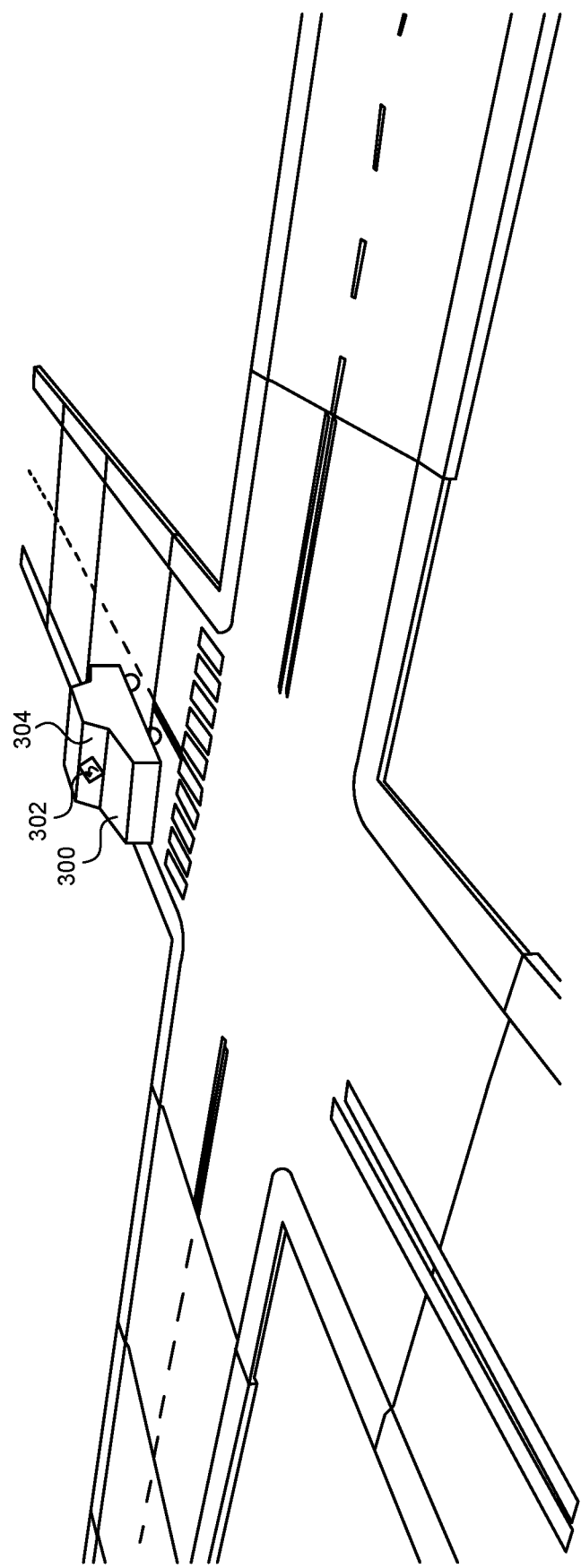
FIG. 3 is an illustration of an autonomous vehicle displaying a standard traffic symbol, in accordance with various embodiments.

The human understandable output can be conveyed using a number of different display formats via the display devices 234. The display devices 234 can be a surface display or other displays mounted on the autonomous vehicle 200. The display devices 234 can be retrofitted and detachably coupled to the autonomous vehicle 200. In one format, the intentions of the control system 202 can be conveyed using images. The intention communication subsystem 204 can select these images from a list of standardized transportation or traffic symbols. These symbols can be displayed on the autonomous vehicle 200's windshield or other surface. When no such standardized symbol exists for conveying the necessary information, words can be displayed instead. For example, FIG. 3 is an illustration of an autonomous vehicle 300, such as the autonomous vehicle 200, displaying a standard traffic symbol 302 on a display 304 visible through a windshield of the autonomous vehicle 300, in accordance with various embodiments.

Figure 4:
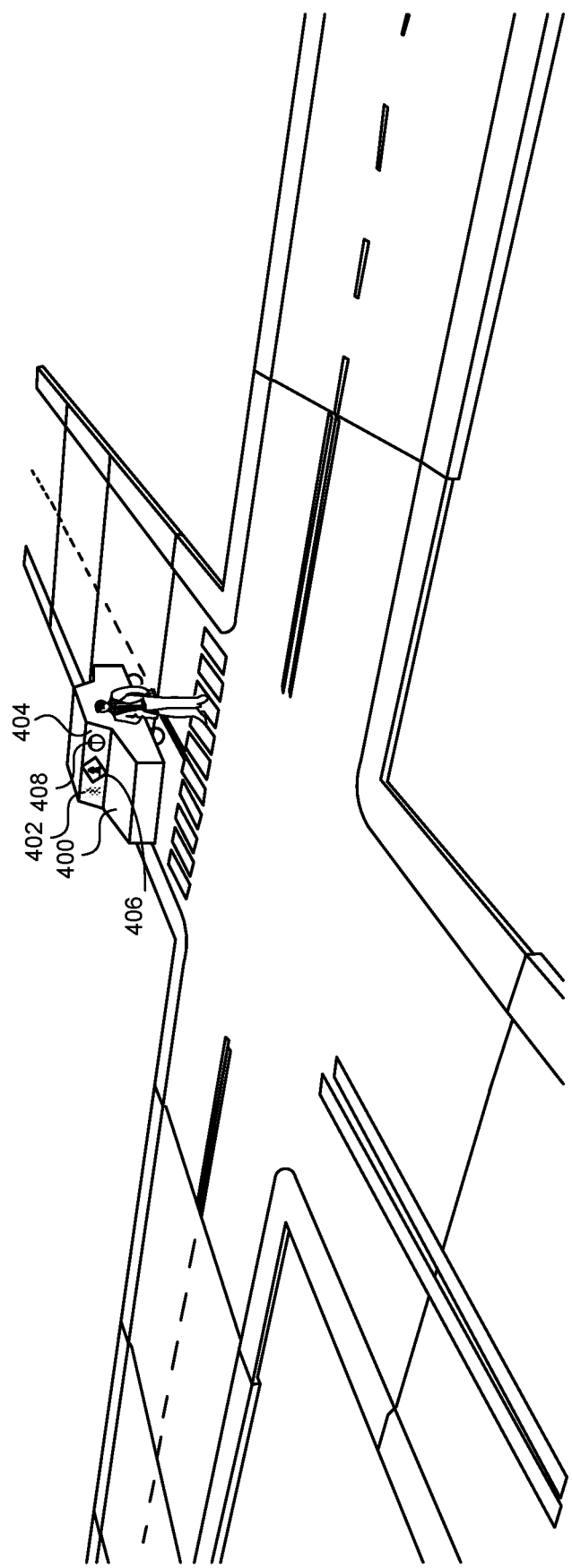
FIG. 4 is an illustration of an autonomous vehicle displaying an image of a nearby pedestrian in a cross walk, in accordance with various embodiments.

In another format, the image displayed can also be a photo of a nearby obstacle or observer. For example, if the autonomous vehicle 200 approaches a cross walk, the intention communication subsystem 204 can display a photo of a pedestrian in the cross walk next to a green light. This conveys that the autonomous vehicle 200 has recognized the presence of the pedestrian, and that the autonomous vehicle 200 intends to yield to the pedestrian. For example, FIG. 4 is an illustration of an autonomous vehicle 400, such as the autonomous vehicle 200, displaying an image 402 of a nearby pedestrian in a cross walk, in accordance with various embodiments. The autonomous vehicle 400 includes a display 404 that presents the image 402 of the pedestrian, an image 406 of the cross walk, and a symbol 408 representing that the autonomous vehicle 200 intends to yield.

Figure 5:
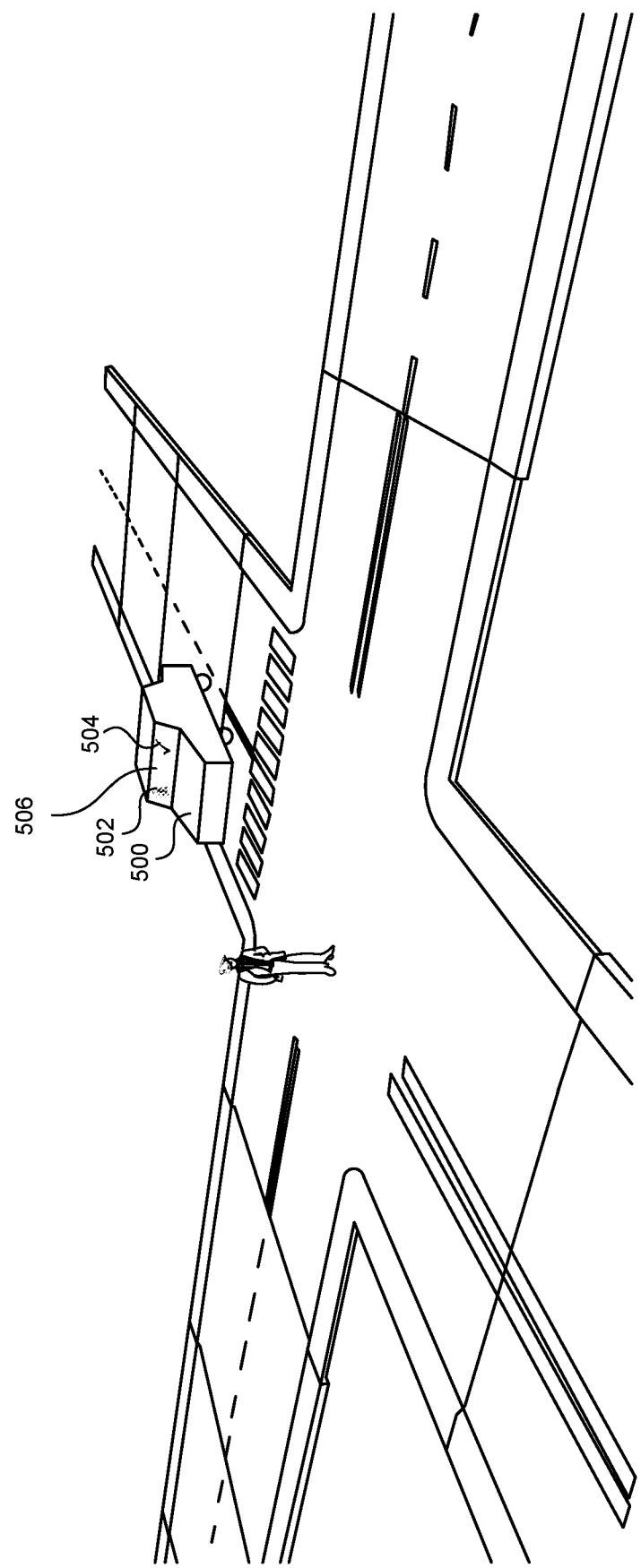
FIG. 5 is an illustration of an autonomous vehicle displaying an image of a traffic officer and a symbol indicating acknowledging a command from the traffic officer, in accordance with various embodiments.

In another example, the intention communication subsystem 204 can display an image of an external observer next to a check mark, such as a green check mark. This would signal to the external observer that the autonomous vehicle 200 has recognized a command issued by the external observer. The command can be visual, auditory, or radio frequency. This command can originate from a traffic officer instructing the autonomous vehicle 200 to proceed through an intersection or to pull to the side of the road. For example, FIG. 5 is an illustration of an autonomous vehicle 500 (e.g., the autonomous vehicle 200) displaying an image 502 of a traffic officer and a symbol 504 on a display 506 indicating acknowledging a command from the traffic officer, in accordance with various embodiments.

Display on Ground or Other Surface

Rather than display the above human understandable output on a surface display of the autonomous vehicle 200, the intention communication subsystem 204 can project, via the one or more projectors 232, the images or words on the ground or other surfaces, such as buildings or other vehicle exteriors, in proximity to the autonomous vehicle 200. This projection can be accomplished using a laser projector or similar projector capable of producing an image viewable under daylight conditions. This projection may also use a light manipulation device, instead of a light generating device, such as an apparatus comprising one or more mirrors, one or more lenses, one or more filters, one or more diffusers, one or more diffraction grids, or any combination thereof. Such light manipulation device can harness the ambient day light to convey the human understandable output.

Figure 6A:
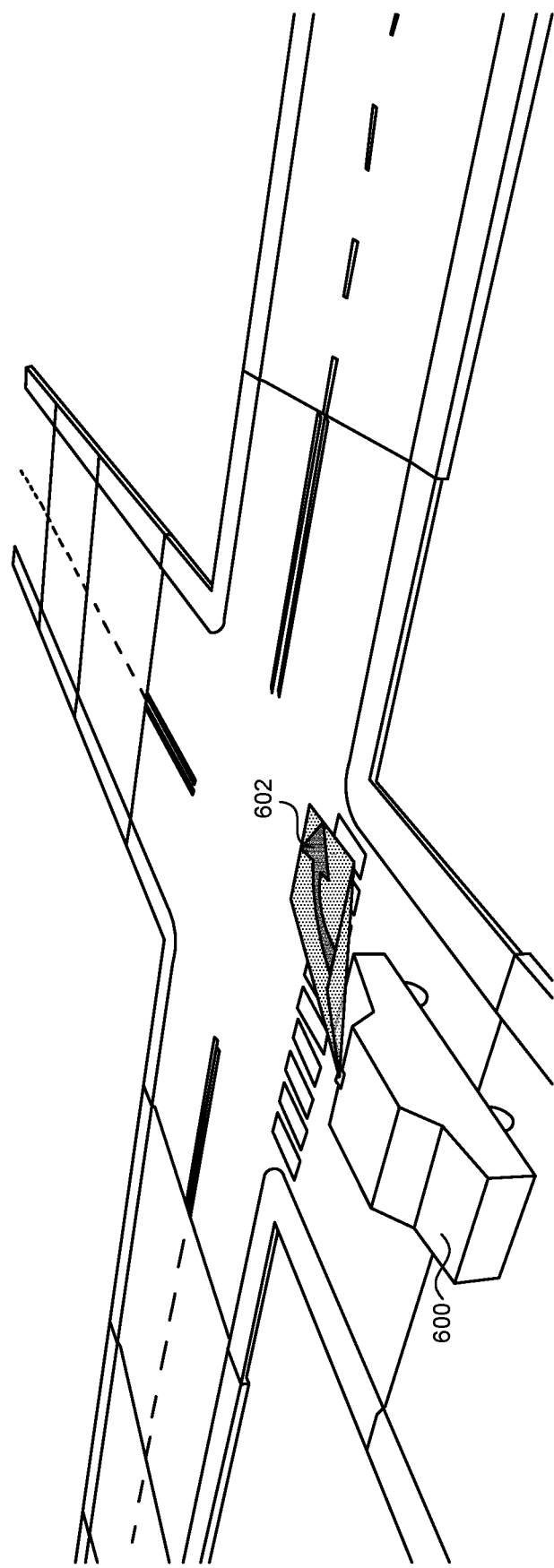
FIG. 6A is an illustration of an autonomous vehicle projecting its upcoming trajectory on a nearby ground surface using an arrow symbol, in accordance with various embodiments.

In addition to displaying the above information, the human understandable output can also indicate one or more aspects of the intended course of action of the autonomous vehicle 200, such as the intended trajectory. This trajectory can be projected in an abstracted or simplified form. For example, an arrow projected on the ground in front of the autonomous vehicle 200 conveys the intended course of action as determined by the control system 202. The direction and shape of this arrow can be altered as needed, so that an arrow that curves to the right would indicate that the autonomous vehicle 200 intends to turn right. If the autonomous vehicle 200 intends to turn right, but not immediately, the bar portion (rectangular portion of an arrow on which the triangular portion is affixed) can be elongated. In some embodiments, the intention communication subsystem 204 can project a countdown (e.g., numeric or symbolic) of when to execute the trajectory. For example, FIG. 6A is an illustration of an autonomous vehicle 600 (e.g., the autonomous vehicle 200) projecting its upcoming trajectory on a nearby ground surface using an arrow symbol 602, in accordance with various embodiments.

Figure 6B:
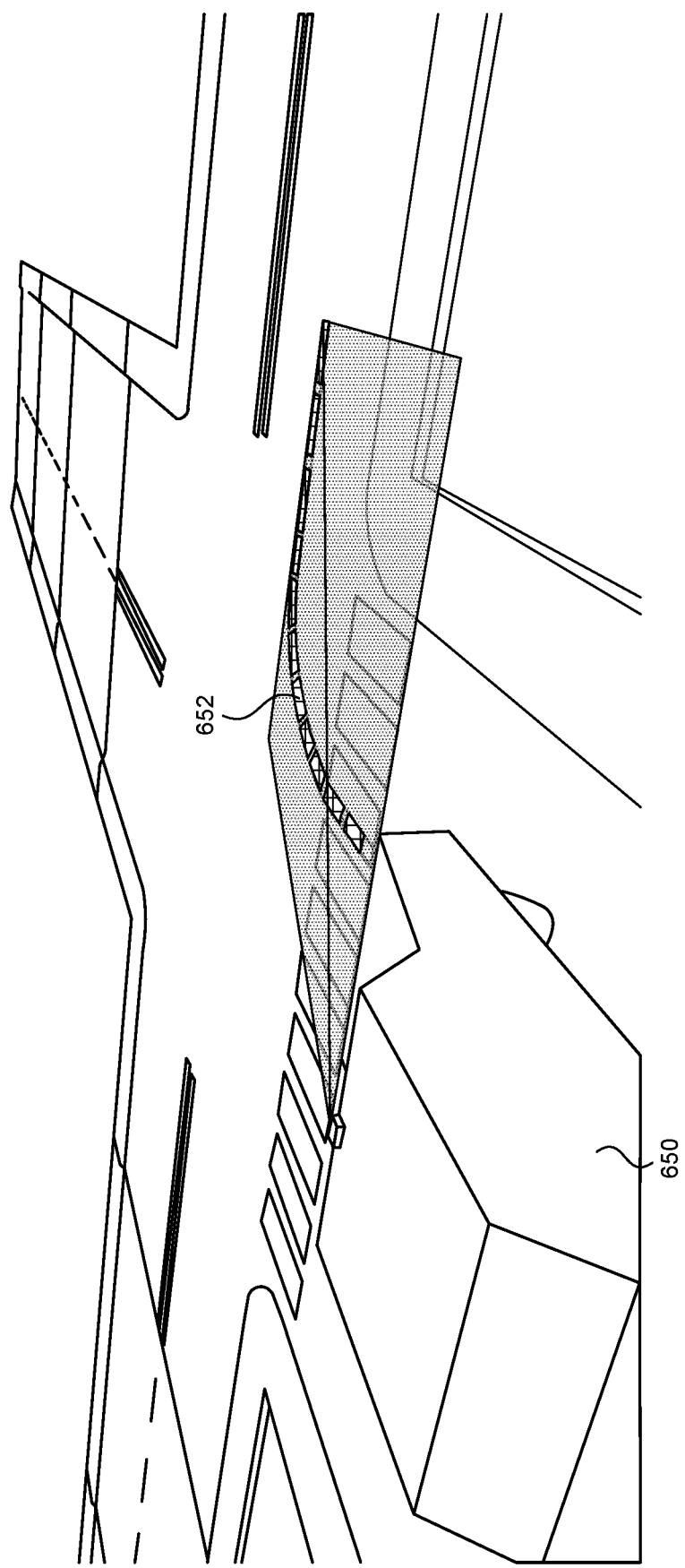
FIG. 6B is an illustration of an autonomous vehicle projecting its upcoming trajectory on a nearby ground surface using a dash line, in accordance with various embodiments.
Figure 6C:
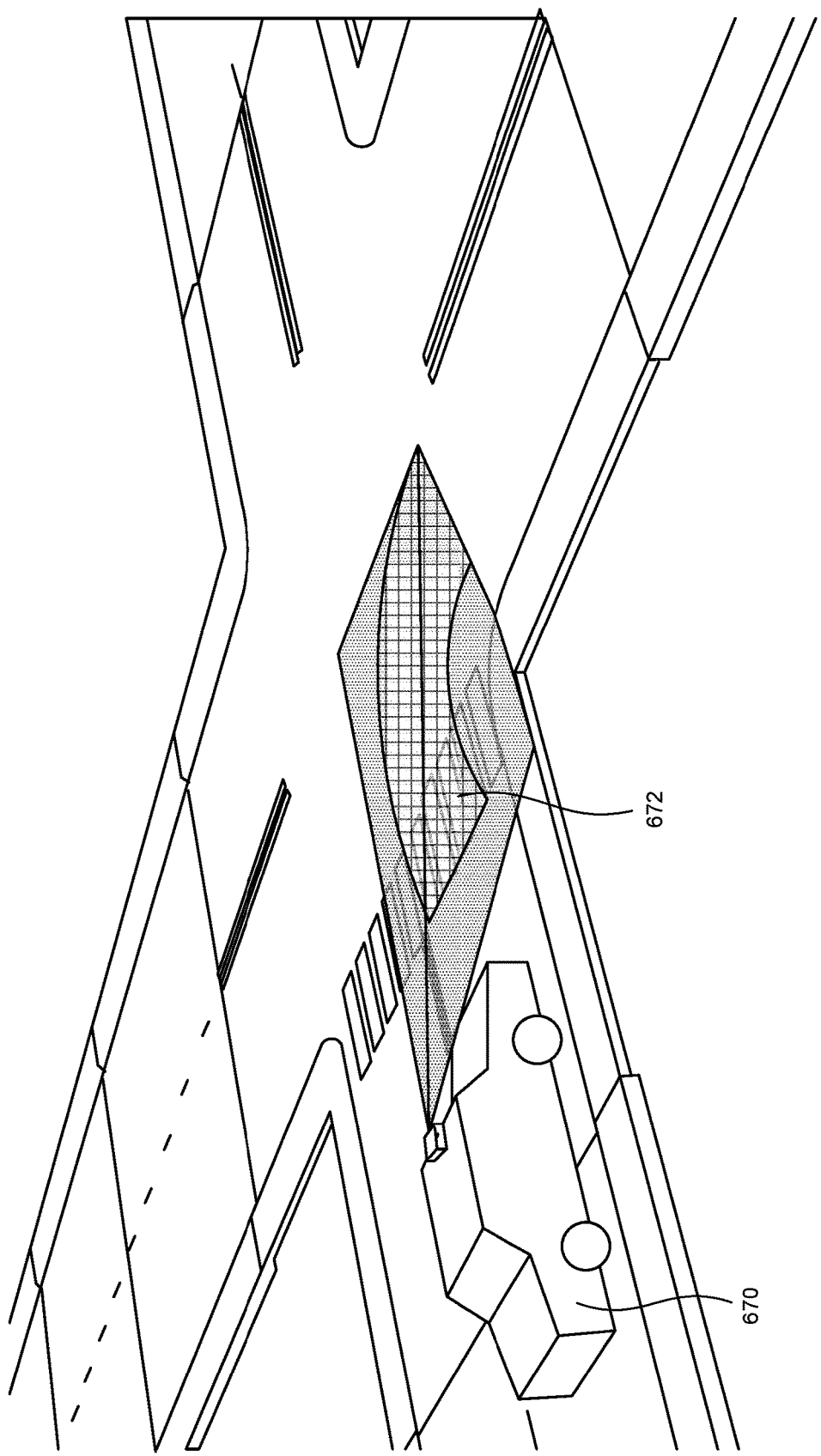
FIG. 6C is an illustration of an autonomous vehicle projecting its upcoming trajectory on a nearby ground surface using a pattern indicating areas that the autonomous vehicle will cover, in accordance with various embodiments.

Alternatively, the trajectory projected can be projected in an absolute form. In this form, the trajectory projected depicts the exact route that the autonomous vehicle 200 intends to follow. For example, when parking the trajectory can be displayed as a dashed line, which curves into a parking spot. For another example, FIG. 6B is an illustration of an autonomous vehicle 650 (e.g., the autonomous vehicle 200) projecting its upcoming trajectory on a nearby ground surface using a dash line 652, in accordance with various embodiments. For yet another example, FIG. 6C is an illustration of an autonomous vehicle 670 (e.g., the autonomous vehicle 200) projecting its upcoming trajectory on a nearby ground surface using a pattern 672 indicating areas that the autonomous vehicle 670 will cover, in accordance with various embodiments.

Figure 7:
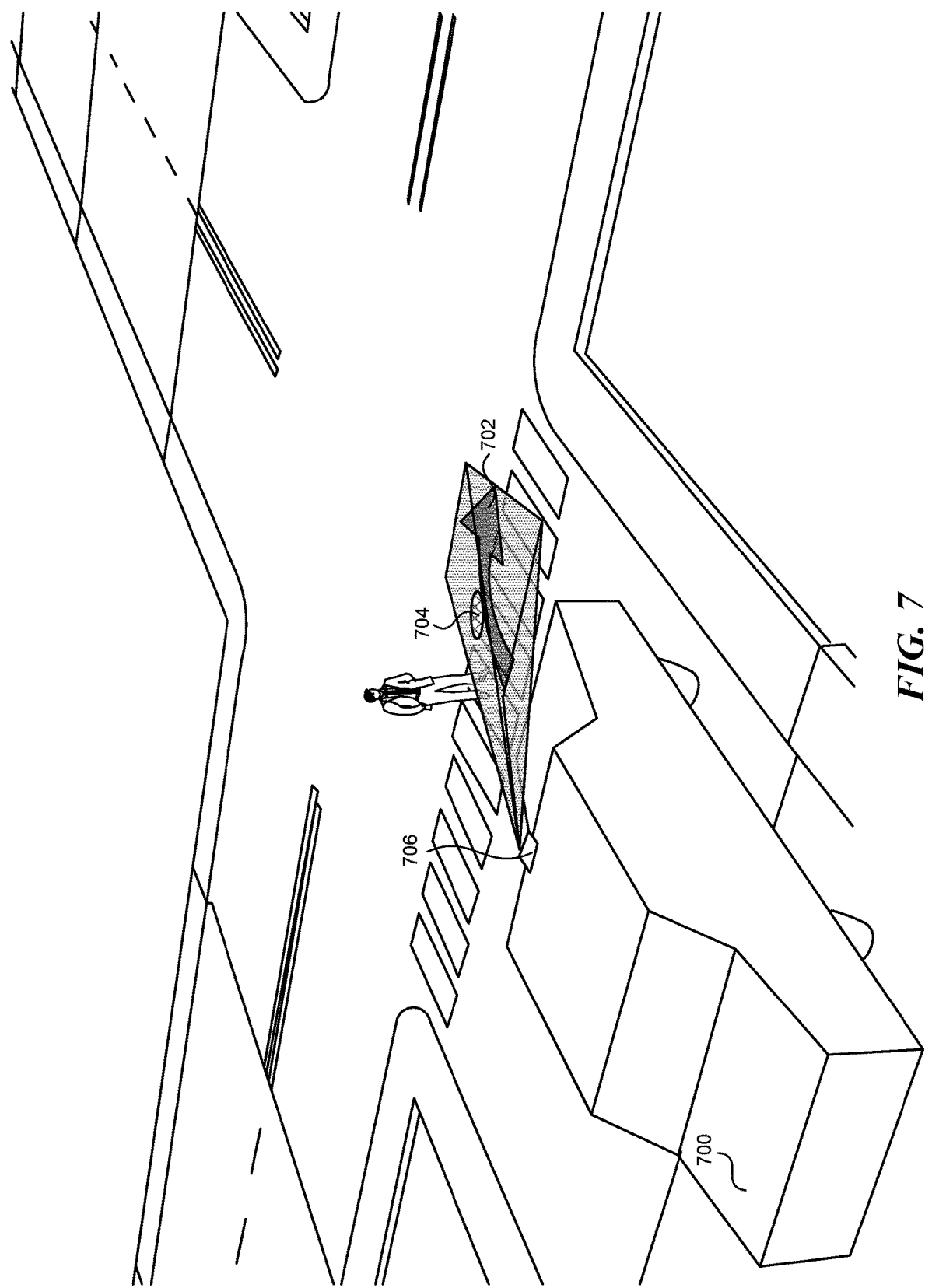
FIG. 7 is an illustration of an autonomous vehicle projecting its upcoming trajectory on a nearby ground surface using an arrow symbol and showing an oval to indicate an obstacle along the upcoming trajectory that the autonomous vehicle is aware of, in accordance with various embodiments.

Additionally, the intended trajectory projected on the ground can include an obstacle symbol, such as a notch indicating the location of a detected obstacle. For example, if the autonomous vehicle 200 intends to turn right at an intersection, but recognizes that a pedestrian is in the crosswalk, the autonomous vehicle 200 can project a right arrow on the ground with a notch cut out of the triangular portion of the arrow, to indicate that the autonomous vehicle 200 recognizes the existence of an obstacle in its trajectory. This notch can be highlighted by using another color, such as red. As the pedestrian proceeds to cross the street, the notch correspondingly moves across the arrow until the pedestrian is no longer in the trajectory. At this point, the autonomous vehicle 200 can continue to project a circle on the ground near the arrow to indicate that the autonomous vehicle 200 recognizes a nearby obstacle but that the autonomous vehicle 200 believes the obstacle to be safely outside the intended trajectory. For example, FIG. 7 is an illustration of an autonomous vehicle 700 (e.g., the autonomous vehicle 200) projecting its upcoming trajectory on a nearby ground surface using an arrow symbol 702 and showing an oval 704 to indicate an obstacle along the upcoming trajectory that the autonomous vehicle 700 is aware of, in accordance with various embodiments. The autonomous vehicle 700 can project with a projector 706 mounted on its top cover near the windshield.

Figure 8:
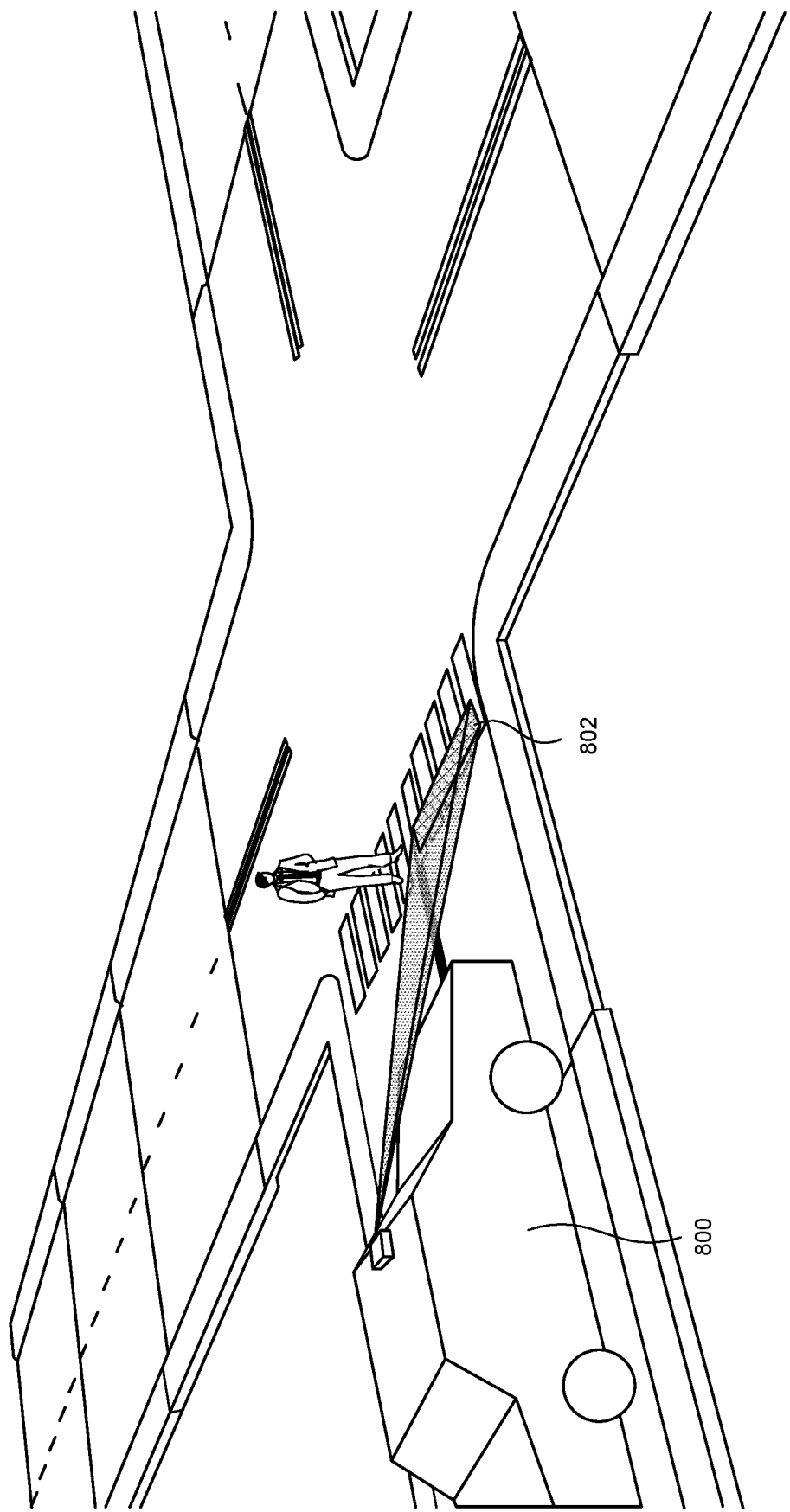
FIG. 8 is an illustration of an autonomous vehicle projecting an image of a bar indicating a border beyond which the autonomous vehicle would not traverse, in accordance with various embodiments.

Similar to displaying a notch, the intended trajectory projected on the ground can include an "anti-trajectory" or exclusion zones that the autonomous vehicle 200 intends to avoid. In one example, the anti-trajectory is based on the predicted motion of detected obstacles, such as if the autonomous vehicle 200 detects a pedestrian, via the sensors 210, standing on the corner waiting to cross the street, a large red line can be projected across the path of the autonomous vehicle 200 to indicate that the autonomous vehicle 200 will not proceed forward until the pedestrian crosses the street. For example, FIG. 8 is an illustration of an autonomous vehicle 800 (e.g., the autonomous vehicle 200) projecting an image 802 of a bar indicating a border beyond which the autonomous vehicle 800 would not traverse, in accordance with various embodiments. Alternatively the autonomous vehicle 200 when turning left can project a green left arrow with a red line above the arrow indicating that the vehicle will not travel straight through the intersection.

The trajectory projected on the ground can only display a limited amount of information due to limitations inherent in projecting on the ground. To make the most of the available projection area the information projected can be limited based on time or distance. For example, only the trajectory information for the next three seconds is displayed on the ground. The parameter of this time limitation may be configurable through the configuration interface 206. Alternatively, the trajectory information for the next 100 feet is displayed on the ground. The parameter of this distance limitation may be configurable through the configuration interface 206.

The intended trajectory can also be projected as a pattern. The pattern is comprised of both solid and void portions, such as a crosshatch pattern. The void portions have no light projected on them. This allows for overlapping trajectories to be detected. For example, if the autonomous vehicle 200 is present at each of the entrances to a four way intersection, the center of the resulting overlapping trajectories projected on the ground will be nearly solid at the center of the intersection. As a result, the "solidness" of the pattern projected on the ground can be used to determine the number of autonomous vehicles which are expected to traverse a particular location. Similarly, the increased intensity of the light would also denote that multiple vehicles are expected to traverse a particular location. In various embodiments, the autonomous vehicles can communicate with each other using non-human understandable communication, such as radio frequency communication via the RF antennas 222.

Movement State Indicator

Figure 9:
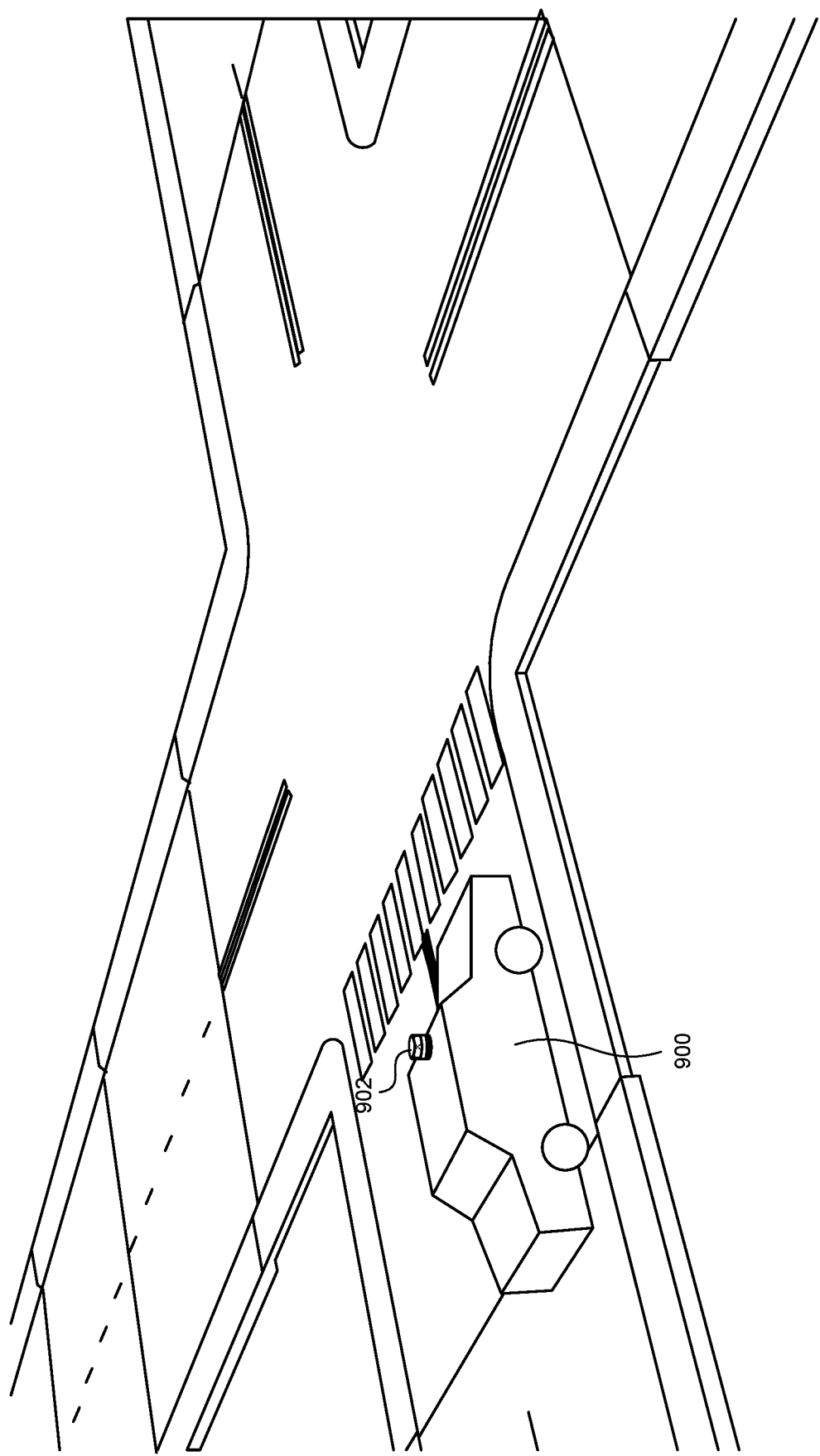
FIG. 9 is an illustration of an autonomous vehicle with a movement state indicator to convey a human readable output corresponding to an intended course of action, in accordance with various embodiments.

The autonomous vehicle 200 can also convey its intentions using a movement state indicator, such as a three color indicator. Any three colors can be used, but the common scheme of green, yellow, and red lights may be the most easily understood. The lights can indicate any number of different things. In one embodiment, the green light indicates that the autonomous vehicle 200 is operating normally and does not detect any dangers. The yellow light indicates that the autonomous vehicle 200 is still operating but detects nearby obstacles which may be causing the autonomous vehicle 200 to operate more slowly or erratically. Finally, the red light indicates that an obstacle or event is preventing the autonomous vehicle 200 from proceeding at all. This three color indicator may be an object mounted to the autonomous vehicle 200, or alternatively the indicator may be incorporated in the image projected on the ground in proximity to the autonomous vehicle 200. For example, FIG. 9 is an illustration of an autonomous vehicle 900 (e.g., the autonomous vehicle 200) with a state indicator 902 to convey a human readable output corresponding to an intended course of action, in accordance with various embodiments.

Anthropomorphic Device

In another embodiment, the autonomous vehicle 200 conveys its intentions using an anthropomorphic device. This anthropomorphic device conveys intentions using actions, motions, or gestures that are similar to those that a human would perform.

This anthropomorphic device may be a sensor pack mounted in the location normally occupied by one of the rear view mirrors in a conventional vehicle. The anthropomorphic device has a pan and tilt head that is used to convey the intentions of the autonomous vehicle 200 to external observers by panning and tilting in the direction that the autonomous vehicle 200 intends to travel. For example, when stopped at an intersection, the anthropomorphic device can pan to "look" right to convey an intention to turn right. Similarly, the anthropomorphic device can pan from left to right when stopped at an intersection to convey an impression that the autonomous vehicle 200 is checking for crossing traffic. At freeway speeds, the anthropomorphic device can pan to the right to convey the control system 202's intention to merge to the right.

In some embodiments, the anthropomorphic device implements a cartoon hand. For example, the cartoon hand can be a mechanically actuated device. For another example, one of the output devices 230 may be used to project or display the cartoon hand on a surface on the autonomous vehicle 200. Alternatively, one of the output devices 230 may be used to project the cartoon hand on the ground in proximity to the autonomous vehicle 200. The cartoon hand can be used to convey instructions to external observers. For example, at a four way stop, the autonomous vehicle 200 can signal another vehicle to proceed through the intersection by projecting a waving hand on the windshield of the autonomous vehicle 200, in a manner similar to a human waving another driver through the intersection. The cartoon hand can also point to specific obstacles to acknowledge the existence of the obstacle. The intention communication subsystem 204 can also signify the receipt of a command from an external observer by displaying the thumbs up sign.

In other embodiments, the anthropomorphic device implements an animated face with eyes. The intention communication subsystem 204 can implement the face using one of the output devices 230. The face can be projected or displayed on a surface of the autonomous vehicle 200 or on the ground in proximity to the autonomous vehicle 200. The face can convey the intended travel direction (according to the control system 202) of the autonomous vehicle 200 by moving the eyes in the direction of the anticipated travel.

External Observer Confirmation

In some instances, the autonomous vehicle 200 will need to request and confirm the attention of an external observer. This can be necessary because the autonomous vehicle 200 requires assistance from the external observer or the autonomous vehicle 200 wants to ensure that the external observer is aware of the existence of the autonomous vehicle 200. To achieve this, the autonomous vehicle 200 first performs a notification step to attract the attention of an external observer. This notification step is performed using an attention getting device (e.g., one of the output devices 230).

In one embodiment, the attention getting device is a notification displayed on the ground in proximity to the autonomous vehicle 200. For example, the autonomous vehicle 200 can project a bright red flashing light on the ground around the autonomous vehicle 200. In another embodiment, the autonomous vehicle 200 can use an outward projecting light to gain the attention of external observers by projecting a light towards the face of an external observer. The intention communication subsystem 204 can analyze the sensor data to confirm that the particular external observer is paying attention to the autonomous vehicle 200.

After gaining the external observer's attention, the autonomous vehicle 200 then conveys and presents the human understandable output, and can request that an action be taken by an external observer in response thereto. For example, the intention communication subsystem 204 can ask an external observer to stand on the sidewalk by displaying a written command on the exterior of the windscreen such as "Please step onto the sidewalk."

The notification may not always be directed at a particular observer or require a response from an external observer. For example, the output devices 230 can include a light bar on its roof similar to those used by taxi cabs that can be used to indicate a specific aspect of the autonomous vehicle 200. In one example, this light bar indicates that the autonomous vehicle 200 is in a convoy. This indication is necessary for the safety of non-autonomous vehicles that may be traveling on the same roadway as the convoy. Without the notification, non-autonomous vehicles may attempt to merge into the convoy. In another example, the light bar can be used to notify nearby semi-autonomous vehicles that the autonomous vehicle 200 desires to enter into a convoy, thus enabling other drivers to navigate into position to form a convoy.

Embedded Data

In each of the above examples, the intention communication subsystem 204 presents a human understandable output. In some embodiments, the human understandable output also encodes a machine readable component. For example, the state indicator described above can strobe its light at a high rate, above 16 hertz, that is imperceptible to humans to encode machine readable information. A specialized sensor is capable of discerning the embedded information. This specialized sensor can be contained within a handheld device, such as a tablet or smartphone, that can be used to display the additional information to the user. A traffic officer or other roadway manager can use such a device to influence, direct, or communicate with the autonomous vehicle 200. In some embodiments, the specialized sensor is embedded in other autonomous vehicles, allowing that autonomous vehicle 200 to receive the information. This embedded information can contain additional details concerning the autonomous vehicle 200's trajectory, state, or intentions.

At least some of the components and/or modules associated with the autonomous vehicle 200 can be implemented in the form of special-purpose circuitry, or in the form of one or more appropriately programmed programmable processors, or a combination thereof. For example, the modules described can be implemented as instructions on a tangible storage memory capable of being executed by a processor or a control circuitry. The tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable gate array, a wireless network capable computing device, or any combination thereof.

Each of the modules and/or components may operate individually and independently of other modules or components. Some or all of the modules may be executed on the same host device or on separate devices. The separate devices can be coupled together through one or more communication channels (e.g., wireless or wired channel) to coordinate their operations. Some or all of the components and/or modules may be combined as one component or module.

A single component or module may be divided into sub-modules or sub-components, each sub-module or sub-component performing separate method step or method steps of the single module or component. In some embodiments, at least some of the modules and/or components share access to a memory space. For example, one module or component may access data accessed by or transformed by another module or component. The modules or components may be considered "coupled" to one another if they share a physical connection or a virtual connection, directly or indirectly, allowing data accessed or modified from one module or component to be accessed in another module or component. In some embodiments, at least some of the modules can be upgraded or modified remotely. The autonomous vehicle 200 may include additional, fewer, or different modules for various applications.

Figure 10:
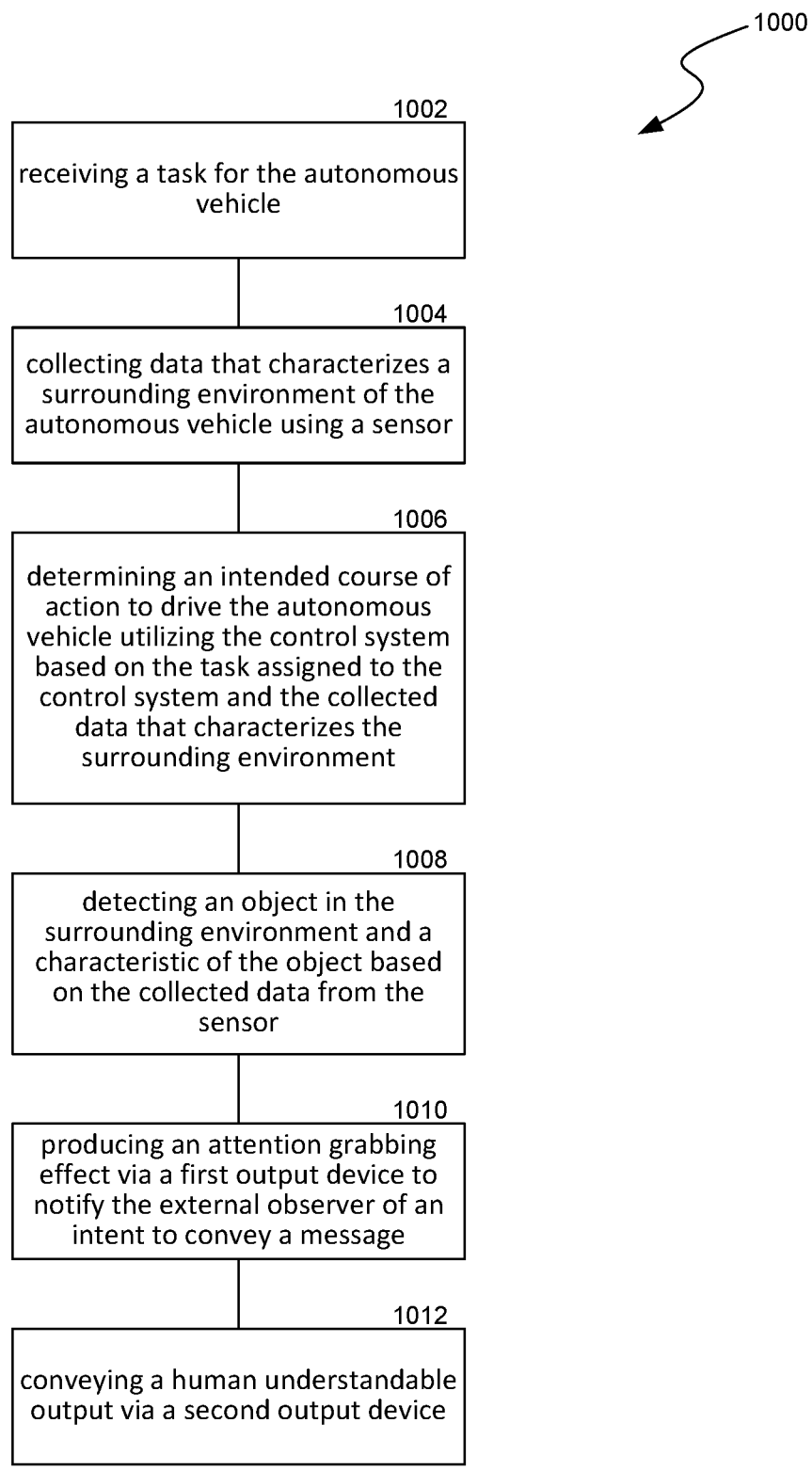
FIG. 10 is a flow chart of a method of operating an autonomous vehicle to convey an intended course of action to an external observer, in accordance with various embodiments.

FIG. 10 is a flow chart of a method 1000 of operating an autonomous vehicle (e.g., the autonomous vehicle 200 of FIG. 2) to convey an intended course of action to an external observer, in accordance with various embodiments. The autonomous vehicle can be driven by a control system (e.g., the control system 202 of FIG. 2). The method 1000 includes the control system receiving a task (e.g., a navigation task) for the autonomous vehicle at step 1002. For example, the task can be to drive to a particular destination, to undertake a goal that requires movement (e.g., to pick up trash, to obtain fuel, to join a convoy), to secure the autonomous vehicle (e.g., to lock the door or start an alarm under certain circumstances, etc.), to influence the autonomous vehicle's environment (e.g., to request removal of an obstacle in the surround environment or to request assistance in refueling), or other vehicle-related, location-based, or navigation-related tasks.

At step 1004, the control system collects data that characterizes a surrounding environment of the autonomous vehicle using a sensor (or multiple sensors, such as the sensors 210 of FIG. 2) coupled to the control system. Data is collected in real-time while the autonomous vehicle is operative (e.g., both when moving and when stationary). At step 1006, the control system determines an intended course of action to drive the autonomous vehicle utilizing the control system based on the task assigned to the control system and the collected data related to the surrounding environment.

At step 1008, the control system or an intention communication system (e.g., the intention communication subsystem 204 of FIG. 2) detects an object in the surrounding environment and a characteristic of the object based on the collected data from the sensor. For example, step 1008 can include detecting presence of an external observer or an obstacle based on the collected data. Step 1008 can include detecting a location of the external observer or the obstacle relative to the location of the autonomous vehicle.

At step 1010, the control system produces an attention grabbing effect via a first output device to notify the external observer (e.g., either a specific external observer detected in step 1008 or any external observer in proximity to the autonomous vehicle) of an intent to convey a message. For example, producing the attention grabbing effect can include displaying a notification on a ground surface in proximity to the autonomous vehicle. The attention grabbing effect can be produced by a light manipulation apparatus or a light producing apparatus. In some embodiments, step 1008 includes detecting a face of the external observer based on the collected data. Step 1010 can then include producing the attention grabbing effect by projecting light towards a direction corresponding to the detected face of the external observer.

At step 1012, the intention communication system conveys a human understandable output (e.g., as the intended message) via a second output device (e.g., one of the output devices 230 of FIG. 2). In some embodiments, the second output device has more than two states, unlike a conventional turn signal or brake light. The first output device can be the same or different from the second output device. The human understandable output indicates the intended course of action of the autonomous vehicle to the external observer.

Conveying the human understandable output can include targeting the human understandable output at a detected location of the external observer utilizing the second output device that is directional. Conveying the human understandable output can include conveying any of a standardized transportation symbol, a human language word, or an image on a display of the autonomous vehicle. The image can be an image of the external observer. For example, step 1008 can optionally include the control system detecting a gesture-based command from the external observer to the autonomous vehicle based on the collected data (e.g., by running a gesture detecting process on video or photographs of the surrounding environment). The image of the external observer (as the issuer of the gesture-based command) can be used to convey an acknowledgement of the receipt and approval of the gesture-based command. Conveying the human understandable output can also include conveying using a sound producing apparatus with a sound clip as the human understandable output or projecting the human understandable output via a projector to a ground surface in proximity to the autonomous vehicle.

In some embodiments, step 1006 can include determining to make a request the external observer. In that case, step 1012 can include presenting the request to the external observer. The autonomous vehicle can present the request generally via at least one of its output devices or target at least one of the output devices at the specific external observer.

In some embodiments, conveying the human understandable output includes indicating that the autonomous vehicle is in a convoy. For example, step 1006 can include determining that the autonomous vehicle is to enter into a convoy; and step 1012 can include indicating, via the human understandable output, that the autonomous vehicle is waiting for or ready to enter into the convoy.

Step 1008 can optionally include the control system detecting a potential obstacle in proximity to the autonomous vehicle. The potential obstacle can be the external observer, who is located in substantial proximity to a trajectory of the autonomous vehicle, based on the collected data that characterizes the surrounding environment.

In various embodiments, step 1012 includes indicating one or more aspects of the intended course of action via the human understandable output. For example, the aspects can include an intended trajectory of the autonomous vehicle or a location of a potential or detected obstacle. The intended trajectory can be presented as an arrow, a dash line, or some other pattern. For example, the intention communication system can determine an extent (e.g., length of the arrow or the dashed line) of the intended trajectory based on a predetermine time interval. The intended trajectory can be indicated using a laser or a projector. The pattern of the intended trajectory can include voids such that, when multiple vehicles project onto a same location, a resulting pattern of overlapping projections has fewer or smaller voids.

For another example, the aspects can include an avoidance area that the autonomous vehicle intends to avoid. The avoidance area can be determine in step 1006. For example, determining the intended course of action can include detecting an obstacle based on the collected data and determining the avoidance area by estimating a predicated motion of the detected obstacle.

In some embodiments, the second output device is an anthropomorphic device configured to convey the human understandable output. The anthropomorphic device can be a mechanically actuated device (e.g., the mechanically actuated devices 240 of FIG. 2). For example, the anthropomorphic device can be a sensor pack mounted in a location normally occupied by a rear view mirror in a conventional automobile. The anthropomorphic device can be a camera capable of pan, tilt, and zoom. The anthropomorphic device can be a cartoon hand.

The anthropomorphic device can be a display (e.g., one of the display devices 234) or a projector (e.g., one of the projectors 232) emulating a person or part of a person (e.g., by animating a face). The animated face can include animated eyes. The anthropomorphic device can also present an animation of any other body parts, including a hand or a head. For example, the anthropomorphic device can be configured to perform a gesture as the human understandable output. The gesture, for example, can indicate that the autonomous vehicle recognizes an obstacle or that the autonomous vehicle acknowledges a command (e.g., the gesture-based command) received from the external observer. The gesture can also indicate an intended direction of travel as determined by the control system.

In some embodiments, the human understandable output is a state indicator (e.g., a three color state indicator). The state indicate can indicate movement or navigation state of the control system. For example, the human understandable output is selected from one of three possible states, such as red for stopping, green for moving normally, and yellow for moving slowly. The state indicator can be produced by a light producing device or a projector. The state indicator can be presented on the autonomous vehicle or on a ground surface in proximity to the autonomous vehicle (e.g., by projection). The state indicator can take the form of a line indicating that the autonomous vehicle will not cross the line.

In some embodiments, conveying the human understandable output also includes embedding machine readable information in the human understandable output. The machine readable information can convey additional information beyond which is apparent to a human observer. The intention communication system can embed the machine readable information by pulse-coding the human understandable output. This machine readable information is useful to provide additional information to a mobile device of an external observer. This machine readable information is also useful in helping observers with disabilities. For example, blind pedestrians can use an electronic cane. The electronic cane can convert the machine readable information to audio information or tactile information.

In some embodiments, step 1008 can include detecting external observers with disabilities, such as by detecting presence of a white cane for visually impaired persons. In step 1012, the intention communication system can select the form of the human understandable output to better serve an external observer with a detected disability.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Figure 11:
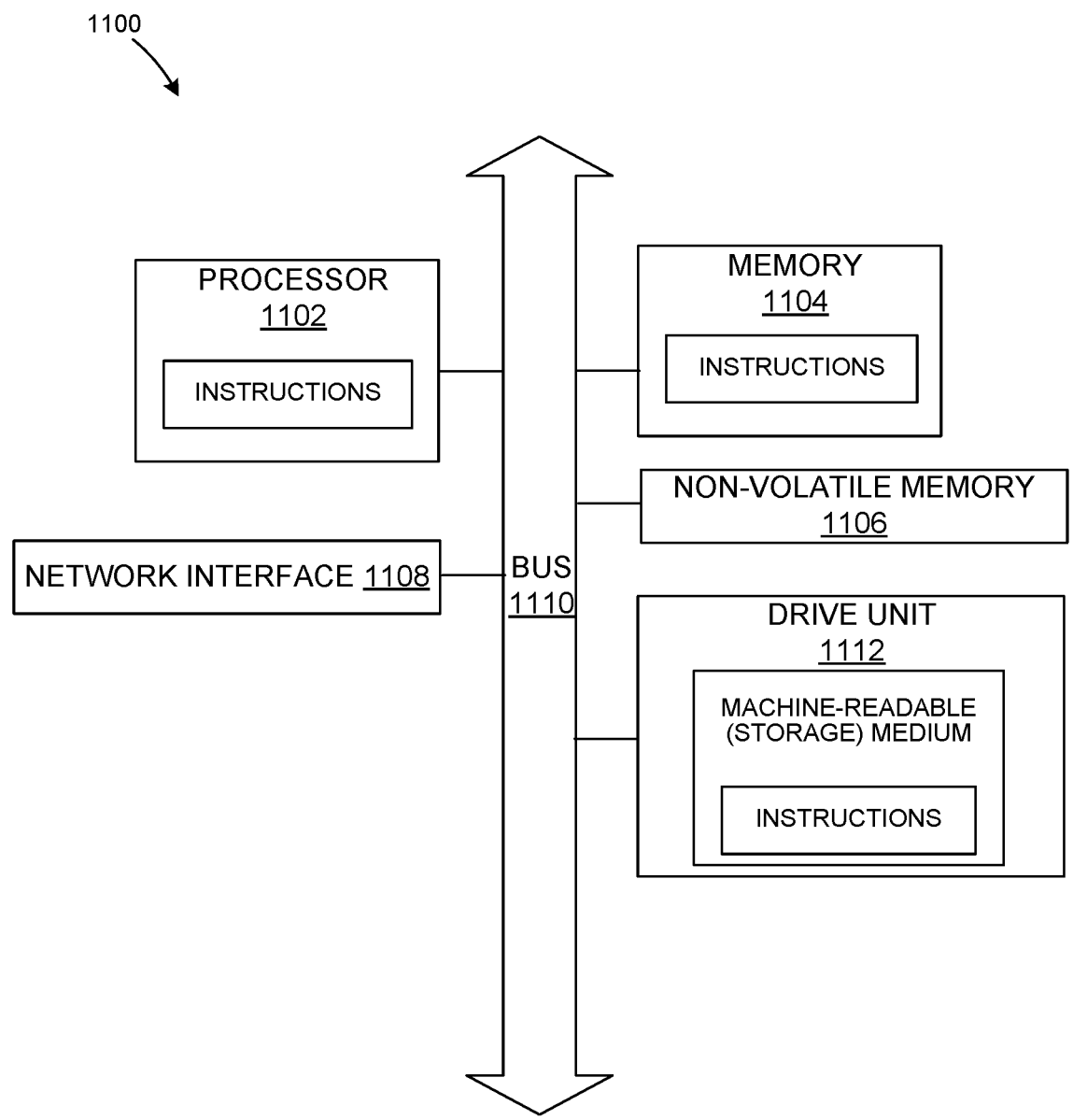
FIG. 11 is a block schematic diagram that depicts a machine in the exemplary form of a computer system, within which a set of instructions for causing the machine to perform any of the herein disclosed methodologies may be executed.

FIG. 11 is a block schematic diagram that depicts a machine in the exemplary form of a computer system 1100, within which a set of instructions for causing the machine to perform any of the herein disclosed methodologies (e.g., FIG. 10) may be executed. For example, the control system 202 or the intention communication subsystem 204 of FIG. 2 can be the computer system 1100. In some embodiments, the computer system 1100 may include a network router, a network switch, a network bridge, personal digital assistant (PDA), a cellular telephone, a Web appliance or any machine capable of executing or transmitting a sequence of instructions that specify actions to be taken. The computer system 1100 is intended to illustrate a hardware device on which any of the instructions, processes, modules and components depicted in the figures above (and any other processes, techniques, modules and/or components described in this specification) can be implemented. As shown, the computer system 1100 includes a processor 1102, memory 1104, non-volatile memory 1106, and a network interface 1108. Various common components (e.g., cache memory) are omitted for illustrative simplicity. The computer system 1100 can be of any applicable known or convenient type, e.g., a personal computer (PC), server-class computer or mobile device (e.g., smartphone, card reader, tablet computer, etc.). The components of the computer system 1100 can be coupled together via a bus and/or through any other known or convenient form(s) of interconnect(s).

One of ordinary skill in the relevant art will recognize that the terms "machine-readable (storage) medium" or "computer-readable (storage) medium" include any type of device that is accessible by the processor 1102. The memory 1104 is coupled to the processor 1102 by, for example, a bus 1110. The memory 1104 can include, by way of example but not limitation, random access memory (RAM), e.g., dynamic RAM (DRAM) and static RAM (SRAM). The memory 1104 can be local, remote, or distributed.

The bus 1110 also couples the processor 1102 to the non-volatile memory 1106 and drive unit 1112. The non-volatile memory 1106 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 1106 can be local, remote, or distributed.

The data structures, modules, and instruction steps described in the figures above may be stored in the non-volatile memory 1106, the drive unit 1112, or the memory 1104. The processor 1102 may execute one or more of the modules stored in the memory components.

The bus 1110 also couples the processor 1102 to the network interface 1108. The network interface 1108 can include one or more of a modem or network interface. A modem or network interface can be considered to be part of the computer system 1100. The network interface 1108 can include an Ethernet card, a Bluetooth card, an optical fiber interface, a cable modem, a token ring interface, or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Some embodiments of the disclosure have other aspects, elements, features, and steps in addition to or in place of what is described above. These potential additions and replacements are described throughout the rest of the specification.

The invention claimed is:

1. A computer-implemented method for an autonomous vehicle to communicate with external observers, comprising:
    collecting, by one or more processors of the autonomous vehicle, data that characterizes a surrounding environment of the autonomous vehicle from a sensor coupled to the autonomous vehicle;
    determining, by the one or more processors, an intended course of action for the autonomous vehicle to undertake based on an assigned task and the collected data;
    identifying, by the one or more processors, an external observer in the surrounding environment based on the collected data;
    conveying a human understandable output, wherein the human understandable output indicates the intended course of action of the autonomous vehicle to the external observer, the intended course of action comprising a trajectory of the autonomous vehicle, the conveying comprising:
        projecting the trajectory on a ground surface external to the autonomous vehicle, wherein the trajectory is projected on the ground based on a predetermined time limit or a predetermined distance limit; and
        projecting, on the trajectory, a symbol indicating a location of an identified obstacle on the trajectory to indicate that the autonomous vehicle recognizes existence of the obstacle on the trajectory.

2. The method of claim 1, wherein the machine readable information conveys additional information beyond that conveyed in the human understandable output.

3. The method of claim 1, wherein the machine readable information is imperceptible to the external observer.

4. The method of claim 1, wherein embedding the machine readable information includes pulse-coding the human understandable output.

5. The method of claim 1, wherein collecting data that characterizes the surrounding environment includes detecting a gesture associated with the external observer.

6. The method of claim 5, wherein determining the intended course of action for the autonomous vehicle includes, based on the gesture associated with the external observer, determining the intended course of action for the autonomous vehicle.

7. The method of claim 1, comprising:
    identifying an external observer directing traffic;
    communicating with a device associated with the external observer directing traffic using the machine readable information;
    based on a machine readable information received from the device associated with the external observer, determining the intended course of action of the autonomous vehicle.

8. The method of claim 1, comprising:
    identifying an external observer directing traffic;
    detecting a gesture associated with the external observer directing traffic;
    based on the gesture associated with the external observer directing traffic, determining the intended course of action for the autonomous vehicle.

9. A system for an autonomous vehicle to communicate with external observers, comprising:
    a processor configured to:
    collect data that characterizes a surrounding environment of the autonomous vehicle from a sensor coupled to the autonomous vehicle;
    determine an intended course of action for the autonomous vehicle to undertake based on an assigned task and the collected data;
    identify an external observer in the surrounding environment based on the collected data;
    convey a human understandable output, wherein the human understandable output indicates the intended course of action of the autonomous vehicle to the external observer, and wherein conveying the human understandable output comprises;
        projecting a trajectory of the autonomous vehicle on a ground surface external to the autonomous vehicle, wherein the trajectory is projected on the ground based on a predetermined time limit or a predetermined distance limit; and
        projecting, on the trajectory, a symbol indicating a location of an identified obstacle on the trajectory to indicate that the autonomous vehicle recognizes existence of the obstacle on the trajectory.

10. The system of claim 9, wherein the machine readable information conveys additional information beyond that conveyed in the human understandable output.

11. The system of claim 9, wherein the machine readable information is imperceptible to the external observer.

12. The system of claim 9, the processor configured to embed the machine readable information includes the processor configured to pulse-code the human understandable output.

13. The system of claim 9, the processor configured to collect the data that characterizes the surrounding environment includes the processor configured to detect a gesture associated with the external observer.

14. The system of claim 13, the processor configured to determine the intended course of action for the autonomous vehicle includes the processor configured to determine, based on the gesture associated with the external observer, the intended course of action for the autonomous vehicle.

15. The system of claim 9, comprising the processor configured to:
   identify an external observer directing traffic;
   communicate with a device associated with the external observer directing traffic using the machine readable information;
   based on a machine readable information received from the device associated with the external observer, determine the intended course of action of the autonomous vehicle.

16. The system of claim 9, comprising the processor configured to:
   identify an external observer directing traffic;
   detect a gesture associated with the external observer directing traffic;
   based on the gesture associated with the external observer directing traffic, determine the intended course of action for the autonomous vehicle.

17. A vehicle comprising:
   a control system with electronic circuitry configured to enable the vehicle to complete an assigned task;
   a sensor, coupled to the control system, configured to collect data related to a surrounding environment of the vehicle;
   wherein the control system is configured to determine an intended course of action for the vehicle based on the assigned task and the collected data, and to identify an external observer in the surrounding environment based on the collected data; and
   an output device, coupled to the control system and configured to:
   convey a human understandable output regarding the intended course of action to the external observer, wherein conveying the human understandable output comprises;
      projecting a trajectory of the autonomous vehicle on a ground surface external to the autonomous vehicle, wherein the output device is further configured to display the projection on the ground based on a predetermined time limit or a predetermined distance limit, and
      projecting, on the trajectory, a symbol indicating a location of an identified obstacle on the trajectory to indicate that the autonomous vehicle recognizes existence of the obstacle on the trajectory.

18. The vehicle of claim 17, wherein the machine readable information conveys additional information beyond that conveyed in the human understandable output.

19. The vehicle of claim 17, wherein the machine readable information is imperceptible to the external observer.

20. The vehicle of claim 17, wherein the control system is configured to detect a location of the external observer based on the collected data; and wherein the output device is configured to project light towards a direction corresponding to the detected location of the external observer.

* * * * *